United States Patent
Walker et al.

(10) Patent No.: US 7,523,552 B2
(45) Date of Patent: Apr. 28, 2009

(54) MILLING BLEED HOLES INTO HONEYCOMB PROCESS

(75) Inventors: David E. Walker, Rochester, NH (US); Barry P. Toth, Wells, ME (US)

(73) Assignee: United Technologies Corporation, Hartford, CT (US)

( * ) Notice: Subject to any disclaimer, the term of this patent is extended or adjusted under 35 U.S.C. 154(b) by 353 days.

(21) Appl. No.: 11/807,892

(22) Filed: May 30, 2007

(65) Prior Publication Data

US 2008/0298919 A1    Dec. 4, 2008

(51) Int. Cl.
B23P 15/04    (2006.01)
B23B 41/00    (2006.01)

(52) U.S. Cl. .................. 29/889.2; 29/889.1; 29/402.02; 29/558; 408/1 R

(58) Field of Classification Search .................. 408/1 R, 408/3, 8, 13; 409/132, 131; 29/402.02, 889.1, 29/889.2, 557–558
See application file for complete search history.

(56) References Cited

U.S. PATENT DOCUMENTS

| | | | |
|---|---|---|---|
| 3,365,172 A | 1/1968 | McDonough et al. | |
| 3,485,282 A * | 12/1969 | Frisman et al. | ................ 29/447 |
| 4,218,066 A | 8/1980 | Ackermann | |
| 4,596,501 A | 6/1986 | Wu | |
| 4,850,093 A * | 7/1989 | Parente | ........................ 29/558 |
| 5,215,435 A | 6/1993 | Webb et al. | |
| 5,281,089 A | 1/1994 | Brown et al. | |
| 5,749,701 A | 5/1998 | Clarke et al. | |
| 6,171,052 B1 | 1/2001 | Aschenbruck et al. | |
| 6,359,254 B1 | 3/2002 | Brown | |
| 6,398,488 B1 | 6/2002 | Solda et al. | |
| 6,435,784 B2 * | 8/2002 | De Mattia et al. | ........... 409/132 |
| 6,571,470 B1 * | 6/2003 | Mortzheim et al. | ........ 29/889.1 |
| 7,178,340 B2 | 2/2007 | Jorgensen | |
| 2007/0137039 A1 * | 6/2007 | Ahti et al. | ................ 29/895.21 |

FOREIGN PATENT DOCUMENTS

| | | |
|---|---|---|
| EP | 0 492 740 | 12/1991 |
| EP | 0 716 218 | 12/1992 |

* cited by examiner

*Primary Examiner*—Erica E Cadugan
(74) *Attorney, Agent, or Firm*—Kinney & Lange, P.A.

(57) ABSTRACT

A method of milling at least one hole into a honeycomb structure positioned on a part includes storing dimensional information of the part in a computer processor, locating a timing mark on the flange, positioning a milling tool at an angle relative to the honeycomb structure, and milling a first hole into the honeycomb structure at a feed rate of between approximately 1 inch per minute and approximately 3 inches per minute.

20 Claims, 5 Drawing Sheets

MILLING BLEED HOLES INTO HONEYCOMB PROCESS

BACKGROUND

The present invention generally relates to the field of honeycomb structures. In particular, the invention relates to removing material from honeycomb structures.

Honeycomb structures are often used in the field of gas turbine engines, for example, as a seal or a filler material. Temperatures inside gas turbine engines can often reach potentially damaging levels. Thus, bleed passages are often used to allow air to flow through the engine. The bleed passages function to either reduce the temperature within the gas turbine engine or to maintain the temperature within the gas turbine engine at an operational level. An example of a bleed passage would be on a forward inner nozzle support having a plurality of apertures. A honeycomb structure positioned on the forward inner nozzle support is commonly provided with bleed holes that are aligned with the apertures of the forward inner nozzle support. Hot air can thus flow from within the gas turbine engine and through the forward inner nozzle support and the honeycomb structure, maintaining the temperature of the gas turbine engine at operational levels.

Due to the harsh environment of gas turbine engines, honeycomb structures positioned within the gas turbine engine occasionally need to be repaired or replaced. For example, when a groove in the honeycomb structure becomes too deep, the original honeycomb structure is removed. One method of repairing honeycomb structures is to then braze a new honeycomb structure onto the surface of the forward inner nozzle support on which the original honeycomb structure was positioned. After the surface of the forward inner nozzle support has been brazed with the new honeycomb material, some of the material must be removed from the honeycomb structure in order to allow hot air to continue to flow through the forward inner nozzle support and the honeycomb structure.

A method that is currently being used to remove material from honeycomb structures is electrode discharge machining (EDM). While EDM is effective in providing holes in the honeycomb structures, it is a timely and costly process. The equipment needed for EDM is expensive, and the process is time intensive. For example, using EDM to provide 90 holes within a circumference of a honeycomb structure can take up to between approximately 8 hours and approximately 9 hours. During the time that the holes are being created within the honeycomb structure, the gas turbine engine is not in use, costing valuable operating time. Thus, it would be beneficial to provide a timely and less costly method of providing holes within a honeycomb structure.

SUMMARY

A method of milling at least one hole into a honeycomb structure positioned on a part includes storing dimensional information of the part in a computer processor, locating a timing mark on the flange, positioning a milling tool at an angle relative to the honeycomb structure, and milling a first hole into the honeycomb structure at a feed rate of between approximately 1 inch per minute and approximately 3 inches per minute.

DETAILED DESCRIPTION

Figure 1:
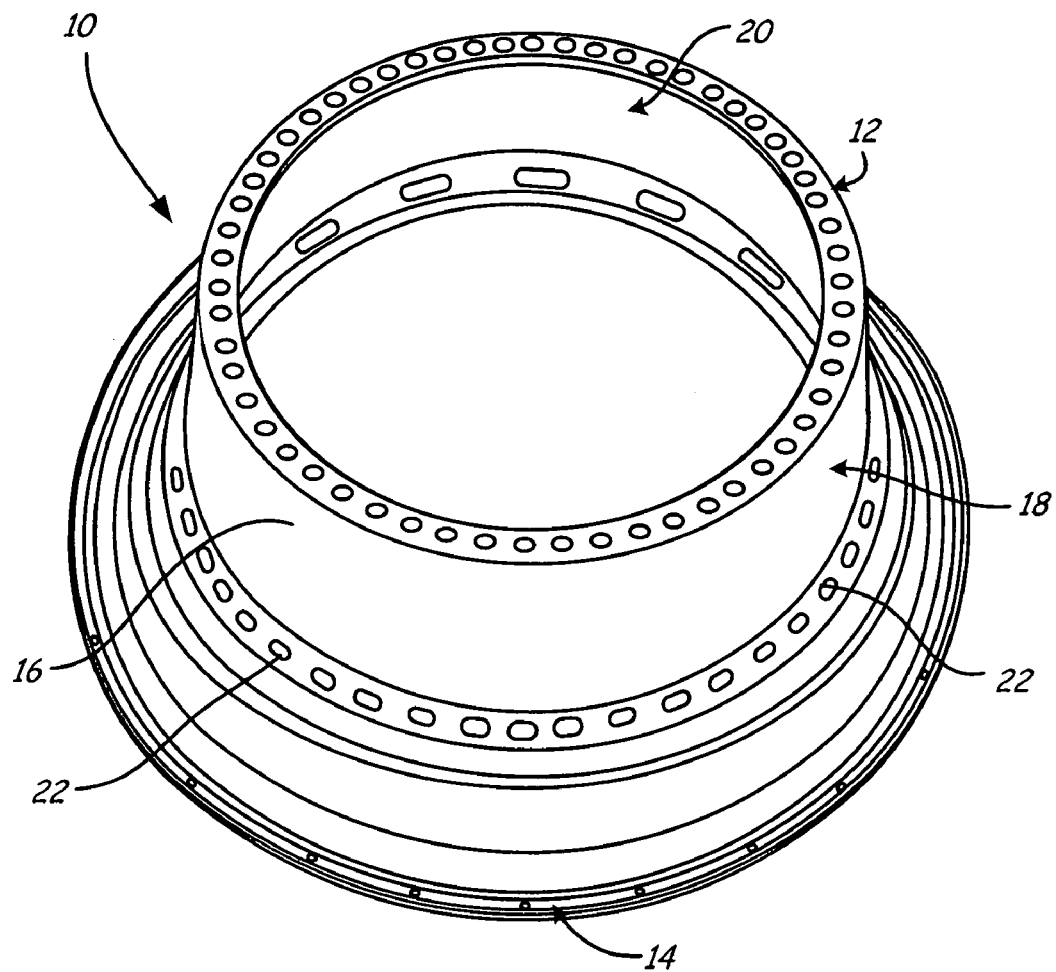
FIG. 1 is a perspective view of a forward inner nozzle support of a gas turbine engine.
Figure 2:
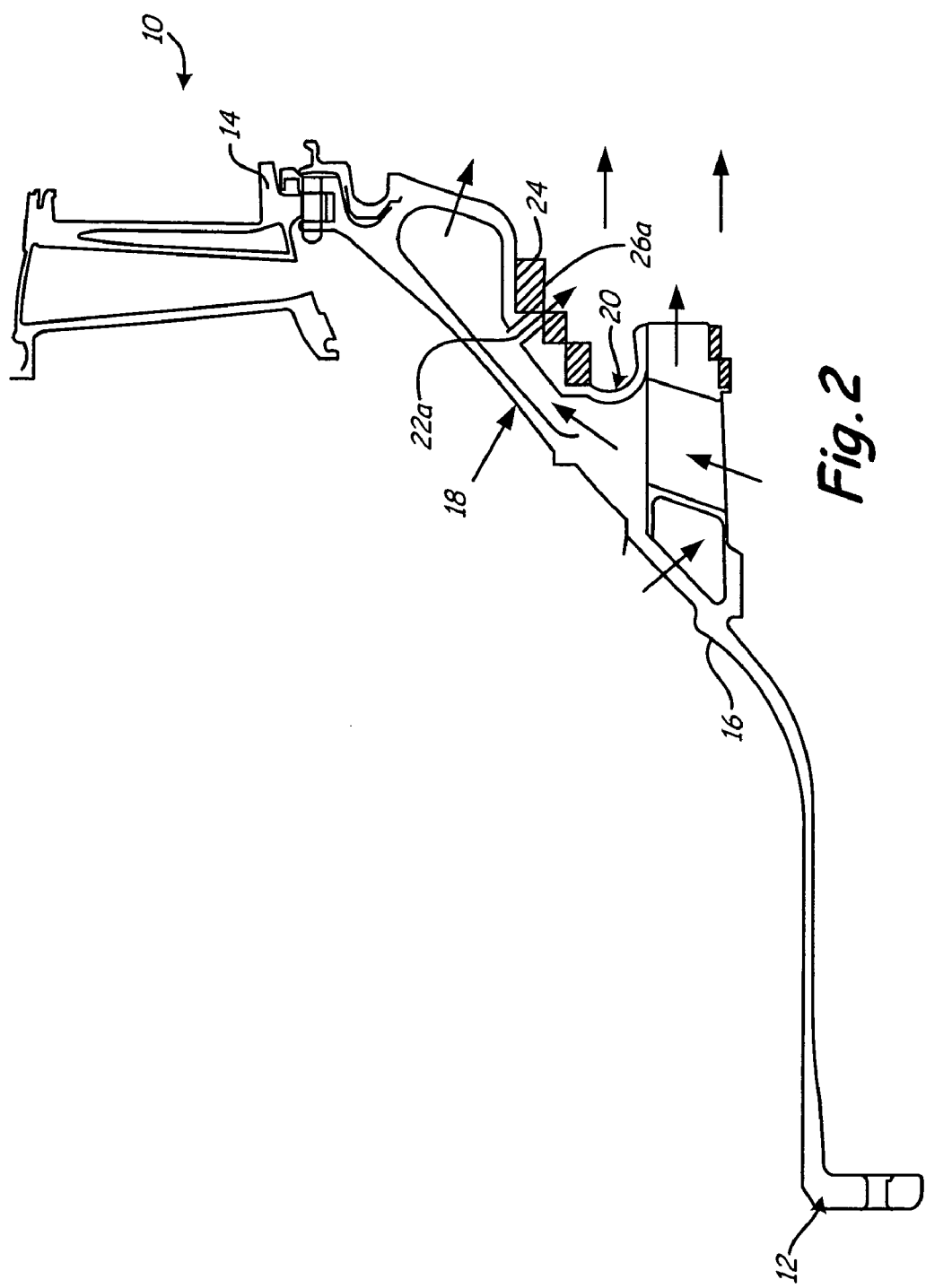
FIG. 2 is a cross-sectional view of the forward inner nozzle support.

FIGS. 1 and 2 show a perspective view and a cross-sectional view of forward inner nozzle support 10 and will be discussed in conjunction with one another. Although FIGS. 1-4 depict a forward inner nozzle support and the specification specifically describes a method of milling bleed holes into a forward inner nozzle support, the method of milling holes into a honeycomb structure disclosed in this application may be applicable to any structure having a honeycomb structure that requires the formation of holes. For example, the method may be applicable to any flange in a gas turbine engine that includes apertures.

Forward inner nozzle support 10 generally includes forward flange 12, rear flange 14, intermediate section 16 between forward flange 12 and rear flange 14, exterior surface 18, and interior surface 20. As can be seen in FIG. 1, intermediate section 14 of forward inner nozzle support 10 includes a plurality of equally spaced apertures 22 around the circumference of forward inner nozzle support 10. As can be seen in FIG. 2, interior surface 20 of forward inner nozzle support 10 includes honeycomb structure 24 positioned at intermediate section 16 of forward inner nozzle support 10. Honeycomb structure 24 includes a plurality of equally spaced holes 26 around forward inner nozzle support 10. Holes 26 of honeycomb structure 24 align with apertures 22 of forward inner nozzle support 10 (FIG. 2 only shows first aperture 22a of forward inner nozzle support 10 and first hole 26a of honeycomb structure 24).

Holes 26 of honeycomb structure 24 are aligned with apertures 22 of forward inner nozzle support 10 to allow the passage of a fluid, such as air, through honeycomb structure 24. In one embodiment, holes 26 of honeycomb structure 24 and apertures 22 of forward inner nozzle support 10 are bleed holes that allow hot air to escape from within a gas turbine engine. Hot air flows from exterior surface 18 of forward inner nozzle support 10 through apertures 22 to interior surface 20, where it passes through honeycomb structure 24 at holes 26. During operation of a gas turbine engine, an original honeycomb structure may be repaired by removing the original honeycomb structure and brazing a new honeycomb structure 24 onto interior surface 20 of forward inner nozzle support 10. When honeycomb structure 24 is initially applied onto interior surface 20 of forward inner nozzle support 10, honeycomb structure 24 does not include holes 26. Thus, apertures 22 of forward inner nozzle support 10 are covered, preventing air flow through forward inner nozzle support 10 due to honeycomb structure 24. Thus, holes 26 are created in honeycomb structure 24 in alignment with apertures 22 of forward inner nozzle support 10.

Milling holes 26 into honeycomb structure 24 takes significantly less time than using EDM to create holes 26. In an exemplary embodiment, ninety holes 26 can be milled into honeycomb structure 24 in approximately 40 minutes, compared to approximately 8 to approximately 9 hours using an EDM process. In addition to reducing the amount of time required to create holes 26, milling equipment is also significantly less expensive to maintain and operate than EDM equipment. Thus, the time and cost associated with repairing or manufacturing honeycomb structures having holes is significantly reduced.

Figure 3:
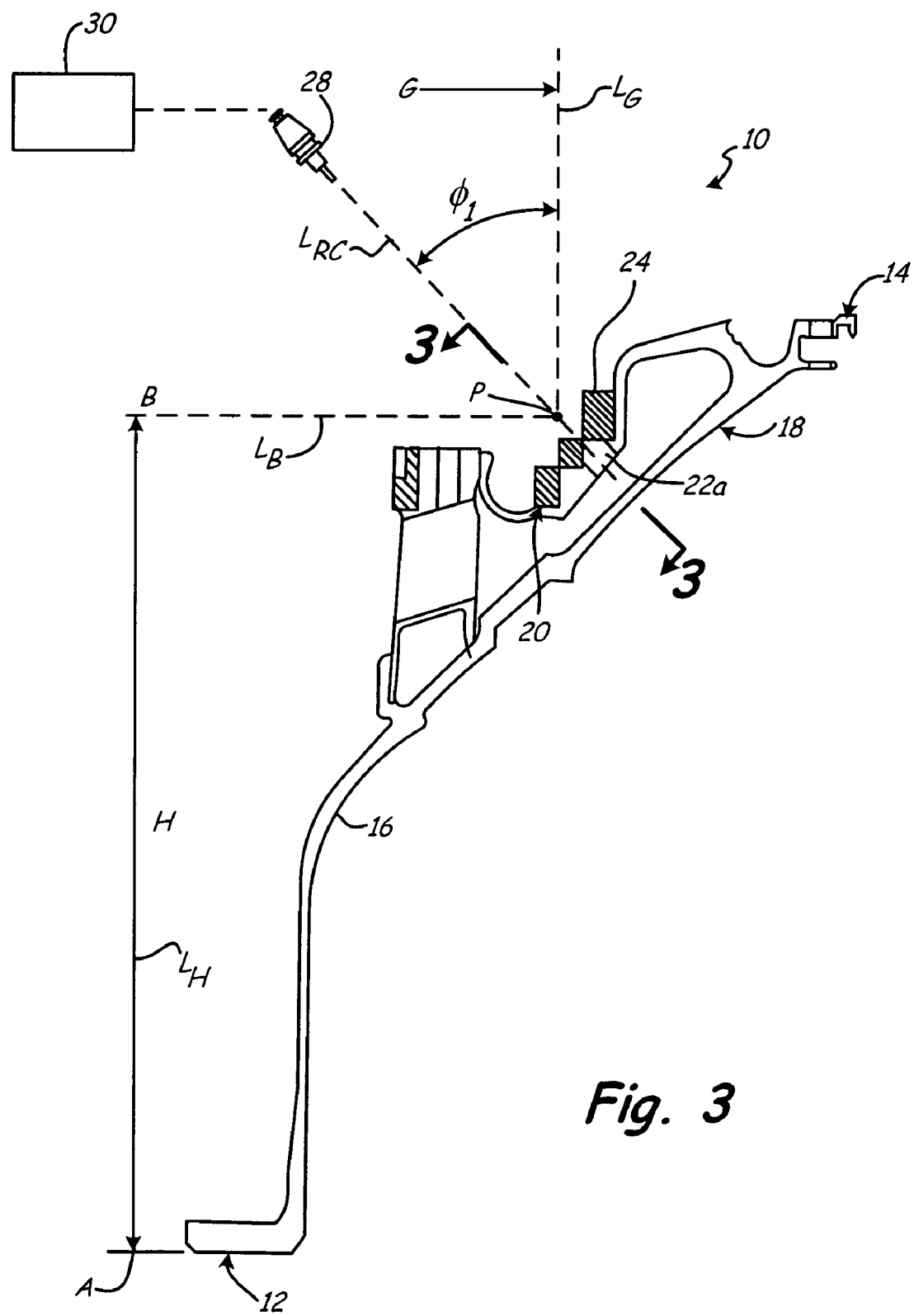
FIG. 3 is a cross-sectional view of the forward inner nozzle support as placed in a machine for servicing.
Figure 4:
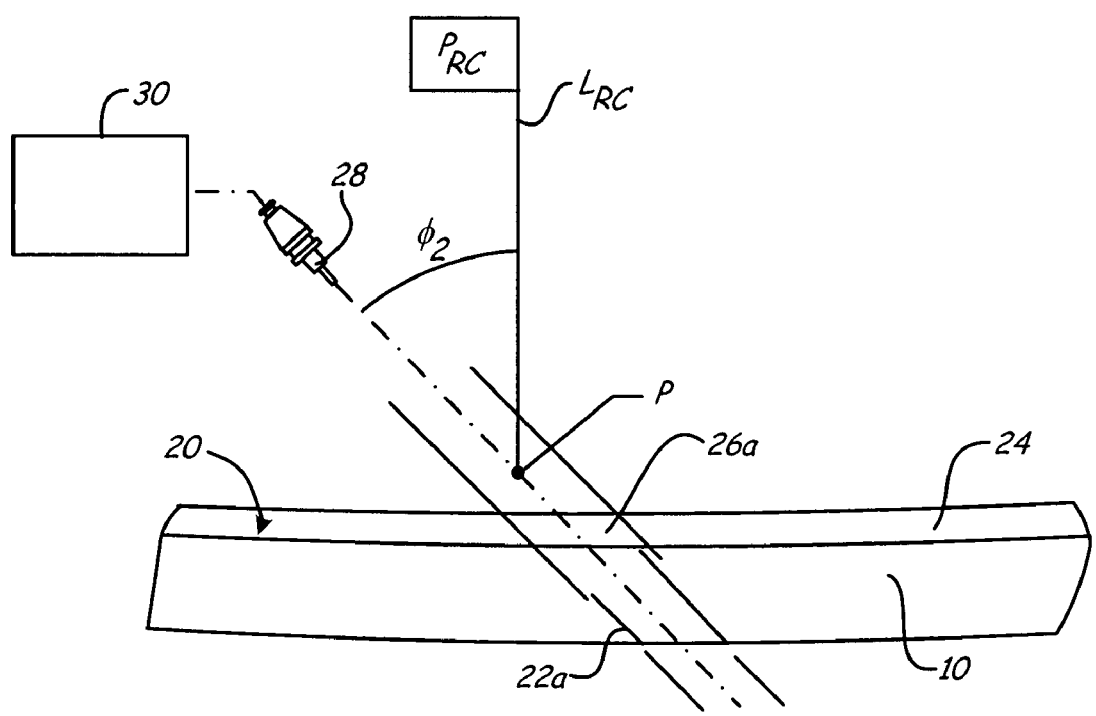
FIG. 4 is an enlarged, sectional view of FIG. 3 taken at lines 3-3.

FIG. 3 shows a cross-sectional view of forward inner nozzle support 10 as forward inner nozzle support 10 is placed in a machine for servicing honeycomb structure 24. FIG. 3 is a mirror image of the view shown in FIG. 2, rotated 90 degrees in the clockwise direction. FIG. 4 shows an enlarged sectional view of FIG. 3 taken at lines 3-3. FIGS. 3 and 4 only show first aperture 22a of forward inner nozzle support 10 and first hole 26a of honeycomb structure 24 and will be discussed in conjunction with one another. During repair of honeycomb structure 24, forward inner nozzle support 10 is mounted within a machine that mills holes 26 through honeycomb structure 24. After honeycomb structure 24 is brazed onto interior surface 20 of forward inner nozzle support 10, it is difficult to see where holes 26 of honeycomb structure 24 should align with apertures 22 of forward inner nozzle support 10. In order to determine where to mill holes 26, a timing feature is used to locate a first hole to be milled 26a. In one embodiment, the timing feature is an offset pin hole located on rear flange 14. From the offset pin hole located in rear flange 14, first hole 26a can be located and milled. Because holes 26 are equally spaced around honeycomb structure 24, after the timing feature is located and first hole 26a has been milled through honeycomb structure 24, the location of remaining holes 26 can be readily determined and milled.

Holes 26 are milled into honeycomb structure 24 by a milling tool 28 having a precise diameter at a specified location, double angle, velocity, and feed rate in order to prevent tearing of honeycomb structure 24. To provide some tolerance, holes 26 may be milled into honeycomb structure 24 at a diameter greater than a diameter of apertures 22 of forward inner nozzle support 10 to ensure that holes 26 of honeycomb structure 24 and apertures 22 of forward inner nozzle support 10 align. By milling holes 26 such that they are oversized compared to apertures 22, some location mismatch is allowed between apertures 22 of forward inner nozzle support 10 and holes 26 milled into honeycomb structure 24. In one embodiment, holes 26 of honeycomb structure 24 are milled such that holes 26 have a diameter of between approximately 0.13 inches and approximately 0.14 inches.

Holes 26 must be milled into honeycomb structure 24 at a specified double angle based on a locating surface point B and a gauge point G of forward inner nozzle support 10. The angles are based on the location of aperture 22a of forward inner nozzle support 10 and a point P on a radial centerline $L_{RC}$ of aperture 22a. As depicted in FIG. 3, a locating point line $L_H$ is drawn from locating surface point A up a specified height H to Point B. From Point P, a first line $L_B$ is drawn normally toward interior surface 20 of forward inner nozzle support 10 where first hole 26a is to be milled. Gauge point G is then located and a gauge point line $L_G$ is drawn normally toward interior surface 20 of forward inner nozzle support 10 from gauge point G until gauge point line $L_G$ intersects first line $L_{RC}$. Point P is located where gauge point line $L_G$ and first line $L_{RC}$ intersect. Radial centerline $L_{RC}$ is determined by swinging down from gauge point line $L_G$ about point P toward interior surface 20 of forward inner nozzle support 10 until a first angle $\theta_1$ is reached. In one embodiment, height H is approximately 7.9045 inches, gauge point G is approximately 19.5385, and first angle $\theta_1$ is approximately 54.2 degrees from gauge point line $L_G$.

After first angle $\theta_1$ has been located, a second angle $\theta_2$ is located from a plane $P_{RC}$ of radial centerline $L_{RC}$, as depicted in FIG. 4. The double angle at which first hole 26a is milled is then located by swinging down from plane $P_{RC}$ of radial centerline $L_{RC}$ at second angle $\theta_2$ toward interior surface 20 of forward inner nozzle support 10, using point P as the pivot point. In one embodiment, second angle $\theta_2$ is approximately 48 degrees from plane $P_{RC}$ of radial centerline $L_{RC}$.

In order to prevent tearing of honeycomb structure 24, holes 26 must also be milled into honeycomb structure 24 at a specified velocity and feed rate. For the purposes of this application, the term "velocity" refers to the velocity at which milling tool 28 is rotating and the term "feed rate" refers to the speed at which milling tool 28 is entering honeycomb structure 24. A suitable milling velocity for milling tool 28 to mill holes 26 is between approximately 2000 revolutions per minute and approximately 3000 revolutions per minute. A particularly suitable milling velocity is approximately 2500 revolutions per minute. A suitable feed rate for milling tool 28 to enter honeycomb structure 24 is between approximately 1 inch per minute and approximately 3 inches per minute. A particularly suitable feed rate is approximately 2 inches per minute.

After first hole 26a has been milled into honeycomb structure 24, milling tool 28 moves relative to forward inner nozzle support 10. Prior to milling first hole 26a, the dimensional information of forward inner nozzle support 10 are entered and stored into a computer processor 30 connected to milling tool 28. Examples of information that is entered and stored in computer processor 30 may include, but is not limited to: the diameter of intermediate section 16 and the number of apertures 22. Based on the stored information, computer processor 30 can determine the location of all apertures 22, and thus, holes 26. Milling tool 28 then moves around the inner circumference of forward inner nozzle support 10 based on the dimensional information in computer processor 30 to the location of hole 26b adjacent to first hole 26a and mills hole 26b. This process continues until all holes 26 have been milled. In one embodiment, computer processor 30 is a numerically controlled machine.

Figure 5:
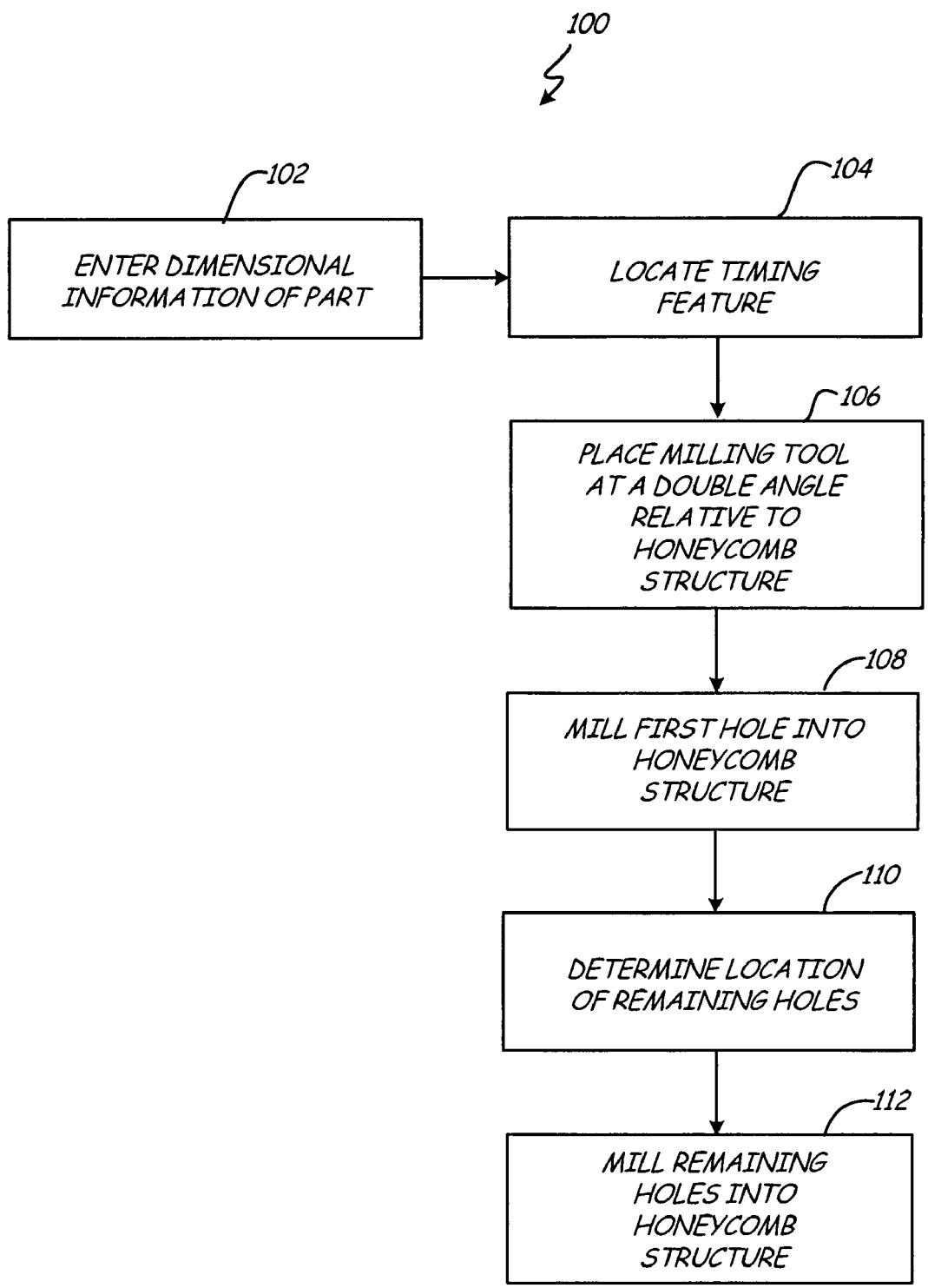
FIG. 5 is a diagram of a method of milling a hole through a honeycomb structure.

FIG. 5 shows a diagram of an exemplary method 100 of milling holes 26 through honeycomb structure 24. To mill holes 26 in honeycomb structure 24, forward inner nozzle support 10 is first mounted in a machine and dimensional information regarding forward inner nozzle support 10 is entered and stored in computer processor 30, Box 102. In one embodiment, the diameter of intermediate section 16 of forward inner nozzle support 10 and the number of apertures 22 in forward inner nozzle support 10 are stored in computer processor 30. A timing feature, such as an offset hole, is then located along rear flange 14 of forward inner nozzle support 10, Box 104. After the location of the timing feature has been determined, computer processor 30 determines the location of first aperture 22a and milling tool 28 is placed at a double angle relative to honeycomb structure 24 to find point P, Box 106. In one embodiment, first angle $\theta_1$ of the double angle is approximately 54.2° from gage point line $L_G$ and second angle $\theta_2$ of the double angle is approximately 48° from plane $P_{RC}$ of radial centerline $L_{RC}$. As depicted in Box 108, once milling tool 28 is properly positioned at point P, first hole 26a is milled into honeycomb structure 24. After computer processor 30 determines the location of remaining holes 26 relative to first hole 26a, milling tool 28 is positioned relative to first hole 26a of honeycomb structure 24, Box 110. The remaining holes 26 are then milled into honeycomb structure 24 such that all holes 26 are equally spaced from each other, Box 112. In an exemplary embodiment, holes 26 have a diameter of between approximately 0.13 inches and approximately 0.14 inches. In one embodiment, holes 26 are milled into honeycomb structure 24 at a velocity of between approximately 2000 revolutions per minute and approximately 3000 revolutions per minute at a feed rate of between approximately 1 inch per minute and approximately 3 inches per minute. In an exemplary embodiment, this method may be entirely computerized with holes 26 being milled into honeycomb structure 24 by a numerically controlled machine.

The method of milling holes into a honeycomb structure on a forward inner nozzle support provides a less expensive alternative to creating holes into the honeycomb structure using EDM. In addition, the amount of time required to create the holes in the honeycomb structure is also significantly reduced, saving both time and money. After a timing feature is located on the forward inner nozzle support, a milling tool mills a first hole at a specified double angle into the honeycomb structure at a specified velocity and feed rate. The location and diameter of the holes milled into the honeycomb structure are also dependent on the existing holes in the forward inner nozzle support that provides the base for the honeycomb structure. After the first hole has been milled, the milling tool is positioned relative to the first hole. Any remaining holes are then milled into the honeycomb structure. This method of milling holes may be used as a repair procedure for creating holes in a honeycomb structure.

Although the present invention has been described with reference to preferred embodiments, workers skilled in the art will recognize that changes may be made in form and detail without departing from the spirit and scope of the invention.

The invention claimed is:

1. A method of milling at least one hole into a honeycomb structure positioned on a part, the method comprising:
    storing dimensional information of the part in a computer processor;
    locating a timing feature on the part;
    positioning a milling tool at an angle relative to the honeycomb structure based upon the location of the timing feature and the dimensional information; and
    milling a first hole into the honeycomb structure at a feed rate of between approximately 1 inch per minute and approximately 3 inches per minute.

2. The method of claim 1, wherein locating the timing feature of the part comprises locating a hole in a flange.

3. The method of claim 1, wherein positioning the milling tool comprises positioning the milling tool at a double angle relative to the honeycomb structure.

4. The method of claim 1, wherein milling the first hole into the honeycomb structure comprises milling at a velocity of between approximately 2000 revolutions per minute and approximately 3000 revolutions per minute.

5. The method of claim 1, wherein milling the first hole into the honeycomb structure comprises milling the first hole at a feed rate of approximately 2 inches per minute.

6. The method of claim 1, wherein the first hole has a diameter of between approximately 0.130 inches and approximately 0.140 inches.

7. The method of claim 1, and further comprising repositioning the milling tool relative to the first hole based on a total number of holes to be milled.

8. The method of claim 1, wherein storing dimensional information of the part in the computer processor comprises storing a number of apertures in the part and a diameter of the part where the apertures are located.

9. A method of milling a hole into a honeycomb structure positioned on a turbine engine part having a plurality of apertures, the method comprising:
    storing dimensional information of the turbine engine part in a computer processor;
    locating a timing mark on the turbine engine part;
    positioning a milling tool at a double angle relative to the honeycomb structure based upon the location of the timing mark and the dimensional information; and
    milling the hole into the honeycomb structure at a velocity of between approximately 2000 revolutions per minute and approximately 3000 revolutions per minute.

10. The method of claim 9, wherein milling the hole into the honeycomb structure comprises milling the hole at a feed rate of between approximately 1 inch per minute and approximately 3 inches per minute.

11. The method of claim 10, wherein milling the hole into the honeycomb structure comprises milling the hole at a feed rate of approximately 2 inches per minute.

12. The method of claim 9, and further comprising milling a plurality of holes into the honeycomb structure.

13. The method of claim 9, wherein the hole has a first diameter and a corresponding one of the apertures has a second diameter, and wherein the first diameter is larger than the second diameter.

14. The method of claim 9, wherein storing the dimensional information of the turbine engine part in the computer processor comprises storing a location of the plurality of apertures in the turbine engine.

15. A method of milling a plurality of holes into a honeycomb structure positioned on a part, the method comprising:
    storing dimensional information of the part in a computer processor;
    locating a timing mark on the part;
    placing a milling tool at an angle relative to the honeycomb structure based upon the location of the timing mark;
    milling a first hole into the honeycomb structure;
    positioning the milling tool relative to the first hole based on the dimensional information; and
    milling a second hole into the honeycomb structure.

16. The method of claim 15, wherein milling the first hole and the second hole comprises milling the holes at a velocity of between approximately 2000 revolutions per minute and approximately 3000 revolutions per minute.

17. The method of claim 16, wherein milling the first hole and the second hole comprises milling the holes at a velocity of approximately 2500 revolutions per minute.

18. The method of claim 15, wherein milling the first hole and the second hole comprises milling the holes at a feed rate of between approximately 1 inch per minute and approximately 3 inches per minute.

19. The method of claim 18, wherein storing dimensional information of the part in the computer processor comprises entering a number of apertures in the part and a diameter of the part where the apertures are located into the computer processor.

20. The method of claim 15, wherein placing the milling tool comprises placing the milling tool at a double angle relative to the honeycomb structure.

* * * * *